Oct. 27, 1959 B. McKIM 2,910,676
MAGNETIC CORE CIRCUIT
Filed Dec. 26, 1957
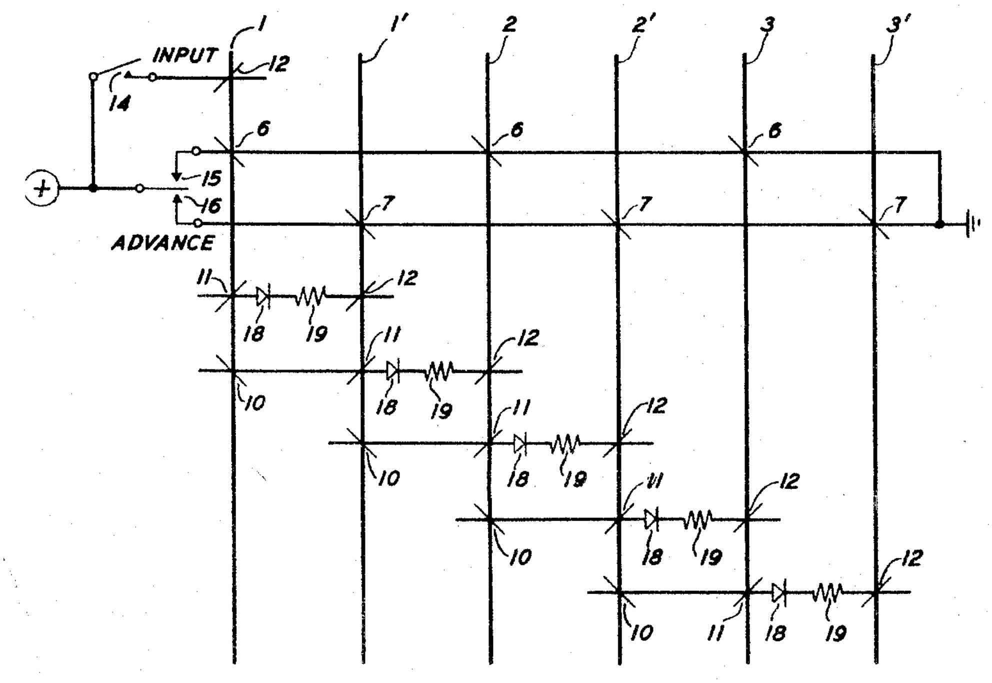
INVENTOR
B. McKIM
BY Kenneth B Hamlin
ATTORNEY United States Patent Office 2,910,676
Patented Oct. 27, 1959

2,910,676

MAGNETIC CORE CIRCUIT

Burton McKim, Morristown, N.J., assignor to Bell Telephone Laboratories, Incorporated, New York, N.Y., a corporation of New York Application December 26, 1957, Serial No. 705,433
4 Claims. (Cl. 340—174)

This invention relates to magnetic core circuits and more particularly to circuits for the storage and processing of coded information.

Magnetic cores having the favorable characteristic of remaining in particular conditions of magnetic saturation have been previously advantageously employed as storage elements in shift registers, memory matrices, word generators, etc. Use of magnetic cores improves such circuits with regard to speed of operation, power required and reliability. The application of magnetic cores having a substantially rectangular hysteresis characteristic in circuits of the above-mentioned types, however, is not without problems peculiar to cores.

Magnetic cores of shift registers or delay lines generally have the windings arranged serially, that is, the output winding of one core is coupled to the input winding of an adjacent succeeding core. Switching a first core from its set or "1" condition of remanent magnetization to the unset or "0" remanent state causes current to flow in the input winding of the immediately succeeding core of such magnitude as to tend to switch the remanent magnetization of the core bearing the input winding. A shift register of this general type is described in the Journal of Applied Physics, volume 21, January 1950, by Wang and Woo in an article entitled, "Static Magnetic Storage and Delay Lines."

If we consider a magnetic core in the shift register and the suceeding core of the register with a serial connection between the output winding of the first core and the input winding of the second core, we can list the possible occasions for current transfer along this coupling connection. These are (1) when the first core is being set to its "1" state; (2) when the first core is being reset and the succeeding core should be set to its "1" state; and (3) when the succeeding core is being reset to its "0" state. It is this third case when information is being read out of the succeeding core to the next core in the shift register that gives rise to the possibility of backsetting of the preceding core. It should be noted that in this backsetting situation it is the normal input winding of the succeeding core which is attempting to force current through the normal output winding of the preceding core.

Isolation of the switching operation between cores in such a shift register has been achieved by the use of unilateral elements, usually diodes, in the coupling circuit between the output winding of the first core and the input winding of the adjacent second core. The diodes in the coupling loops prevent undesired forward transfer of information when a core is shifted from the "0" or unset remanent state to the "1" or set remanent state, and tend to prevent backward transfer of information when the same core is switched from the "1" remanent state to the "0" remanent state. Backward transfer of energy in a shift register has been priorly prevented only by careful selection of the turns ratios between input and output windings, and the use of diodes having favorable nonlinear characteristic. There remains, however, the constant tendency to backset.

Accordingly, it is an object of this invention effectively to prevent the undesired backward transfer of energy in circuits such as shift registers and delay lines employing magnetic cores.

It is a further object of this invention to relax circuit design requirements of magnetic core information processing circuits.

The above and other objects are realized in one illustrative embodiment of this invention wherein the undesired tendency to transfer energy to a preceding core or to backset is eliminated by the addition of windings, termed backbiasing windings herein, on certain of the serially arranged cores.

As discussed above, backsetting currents occur in the output windings of a core immediately preceding a core being advanced or reset. The backbiasing winding is wound to counter the effects of the currents in the above-mentioned output winding and is added in series in the coupling loop of the core being reset or advanced and the succeeding adjacent core. Accordingly, energization of the advance winding of a core wherein a "1" is stored causes both this undesired or backsetting current in the coupling loop between the subject core and the preceding core, which tends to set the preceding core, and a desired current in the output winding of the subject core to transfer the "1" to the succeeding adjacent core. This latter current also energizes the backbiasing winding of the preceding core to counter the effects of the undesired currents in the output winding.

Accordingly when a core in the array is being reset there are, in accordance with my invention, now two back current paths to the preceding core. The one path is the unavoidable path back to the output winding of the preceding core from the input winding of the core being reset; as discussed above it is the tendency of current to flow in this path that gives rise to the possibility of erroneous setting or backsetting of the prior core. The other or second path includes the output winding of the core being reset and the compensating or backbiasing winding on the preceding core; this path of course further includes the input winding of the next succeeding core in the array. Further, this backbiasing winding is oppositely wound to the output winding on the same core. The effect of the large current flow through this backbiasing winding on resetting of the succeeding core is to override any tendency of the smaller current flowing back through the output winding of that core erroneously to set or backset the core. Further, because of the sense of the windings, the flux generated in the core by the compensating of backbiasing winding is in a direction to establish the zero or unset condition of that core.

It is, therefore, a feature of this invention that a backbiasing winding or compensating winding on a preceding magnetic core be included in the series coupling loop between a magnetic core and a succeeding magnetic core in a magnetic core array, such as a shift register.

It is a further feature of this invention that the backbiasing winding be wound on the core in the opposite sense to the output winding on that core, so that current flow through the backbiasing winding on switching of the succeeding core will override the effect of any backsetting current flow through the output winding of the core.

The invention and the above-noted and other features thereof will be understood more clearly and fully from the following detailed description with reference to the accompanying drawing in which the single figure is a circuit diagram of an illustrative two-core per bit, three-stage shift register employing the teachings of this invention.

The magnetic cores and the windings inductively coupled thereto in the illustrative embodiment of the invention are advantageously depicted in the "mirror symbol"

representation described in an article entitled "Pulse Switching Circuits Using Magnetic Cores" by M. Karnaugh, published in the Proceedings of the Institute of Radio Engineers, volume 43, No. 5, May 1955, pages 570 through 583. The magnetic cores are represented by vertical lines with leads to the windings thereon indicated as horizontal lines crossing the core symbols. The presence of a winding on a magnetic core is indicated by a short diagonal bar at the junction of the core and lead symbol, the angle indicating the winding direction.

In the figure, similarly numbered cores comprise a single shift register stage. Information is entered in core 1 of the first stage by closure of switch 14 and energization of winding 12. Windings 6 on each of the first cores in a stage are energized through the closure of switch 15 to advance a binary "1" from the first core of a stage to the second core of the same stage. Windings 7 are energized by the closure of switch 16 to advance a binary "1" from the second core of a stage to the first core of the immediately succeeding stage. It is to be understood that the switches 14, 15, and 16 are merely diagrammatic representations of input and advance circuits well known in the art.

Windings 11 on each of the cores are output windings in the coupling loops to transfer "1's" information to the immediately succeeding core and windings 12 are input windings in series with output windings 11 of the immediately preceding core. Windings 10 on certain of the cores are backbiasing windings in accordance with the invention. Diodes 18 are provided in each of the coupling loops to isolate succeeding cores when a core is set and resistances 19 represent circuit loads through which output information may be taken.

The operation of the subject shift register can best be understood by way of example. Assuming as a starting point that a "1" has been inserted in core 1 through the closure of switch 14 and that this "1" has been shifted to and presently resides in core 1'. Accordingly, core 1' is in its "1" state and all other cores are in their "0" state. Subsequent closure of switch 16 to energize advance winding 7 on cores 1', 2', and 3' will not effect any change in flux in cores 2' and 3' as these were previously reset; however, energization of winding 7 on core 1' will switch the remanent state of core 1' from a "1" to a "0" and voltages will be induced in windings 10, 11 and 12 of core 1'. The voltage induced in winding 12 of core 1' will forwardbias diode 18 in the coupling loop between cores 1 and 1' and tend to cause undesired backsetting currents to flow in winding 11 of core 1. Such currents have priorly been minimized through careful choice of turns ratios between windings 11 and 12 and choice of diodes having favorable nonlinear forward characteristics. The voltage induced in winding 11 of core 1' forwardbiases diode 18 in the coupling loop between cores 1' and 2. This causes current to flow in winding 12 of core 2 to effect a change in magnetic state of core 2 from a "0" to a "1" and also causes current to flow in winding 10 of core 1. This latter current is of sufficient magnitude to counter the effects of the previously mentioned undesired current in winding 11 of core 1. Accordingly, transfer of energy from core 1' to core 1, commonly known as backsetting is eliminated, and the needs for careful choice of turns ratios between output and input windings and for careful choice of diodes with regard to their nonlinear characteristic are considerably relaxed.

As noted above, a voltage is also induced in winding 10 of core 1' on the resetting of core 1' to transfer the information to core 2. This voltage will not cause any current to flow in its serially connected coupling loop, including winding 11 on core 2 and winding 12 on core 2', because the voltage induced in the winding 10 on the core 1' will be of a polarity to backbias the diode 18 on this coupling loop.

Setting of core 2 by resetting the immediately preceding core 1' will induce voltages in windings 10 and 11 of core 2. The voltage induced in winding 10 will forward-bias diode 18 in the coupling loop between cores 2' and 3 and this current will tend to set cores 2' and 3 to their "1" state. Core 2' cannot be set to its "1" state at this time since the advance current applied to winding 7 of core 1' is also applied to core 2' and therefore the latter is maintained in its reset or "0" state. The tendency to set core 3 through the energization of its winding 12 through voltages induced in winding 10 of core 2 is slight since winding 11 of core 2' at this instant presents a high impedance and because of the turns ratios between windings 10 and 12 it may be ignored. The voltage induced in winding 11 of core 2 backbiases diode 18 in the coupling loop between cores 2 and 2' thereby preventing significant current flow.

If both cores 1 and 2 are in the "1" state when the advance windings 6 are energized, the current in winding 10 of core 1 caused by the energization of winding 6 on core 2 will aid the effect of winding 6 on core 1, and thereby will not be harmful. Consequently, it is possible to shift information in parallel from a register of this type into load resistances such as 19 in the coupling loop succeeding the core being advanced.

Transfer of "1's from other cores either serially or in parallel occurs as described above, and in each instance the tendency to transfer energy to a preceding core is eliminated by the added serially connected backbiasing windings.

It is to be understood that the above-described arrangement is illustrative of the application of the principles of the invention. Numerous other arrangements may be devised by those skilled in the art without departing from the spirit and scope of the invention.

What is claimed is:

1. An electrical circuit comprising a plurality of pairs of magnetic cores having a substantially rectangular hysteresis characteristic, input, output and advance windings inductively coupled to each of said cores, coupling means including asymmetrical circuit elements connecting the output winding of each of said cores to the input winding of a succeeding core, compensating windings wound in the opposite sense to the output windings upon each of the cores except the last pair of said cores, means for energizing said advance windings, and means including said coupling means for energizing said compensating windings.

2. An electrical circuit comprising a plurality of groups of first and second cores having a substantially rectangular hysteresis characteristic, a first plurality of advance windings inductively coupled to said first cores of said plurality of groups, a second plurality of advance windings inductively coupled to said second cores of said groups, input and output windings inductively coupled to each of said cores of said groups, and wound in a sense opposite to said advance windings, coupling means including asymmetrical circuit elements connecting the output winding of each of said cores to the input winding of a succeeding one of said cores, compensating windings inductively coupled to each of said first and second cores of all but the last of said groups of cores, said compensating windings wound in the same sense as said advance windings, means for energizing said input winding on said first core of said first group of said cores, means for alternately energizing said first and second plurality of advance windings, and means for energizing said compensating windings.

3. An electrical circuit comprising a first and second plurality of cores having a substantially rectangular hysteresis characteristic, input, output, advance, and compensating windings inductively coupled to each of said cores, said compensating and said advance windings being wound in the same sense and in a sense opposite to said output windings, a plurality of coupling means each including the output winding of a core of one of said pluralities of cores, the input winding of a core of the other of said pluralities of cores and the compensating winding of another core of said other plurality of said cores, and means for energizing said advance windings.

4. An electrical circuit in accordance with claim 3 wherein each of said coupling means also includes an asymmetrical circuit element.

References Cited in the file of this patent

UNITED STATES PATENTS

| | | |
|---|---|---|
| 2,708,722 | An Wang | May 17, 1955 |
| 2,769,925 | Saunders | Nov. 6, 1956 |
| 2,781,503 | Saunders | Feb. 12, 1957 |